United States Patent
Montalbano (10) Patent No.: US 7,860,198 B2
(45) Date of Patent: Dec. 28, 2010

(54) COMBINING SIGNAL-INTERFERENCE-RATIO (SIR) ESTIMATES FOR IMPROVED SIR ESTIMATION

(75) Inventor: Giuseppe Montalbano, Villeneuve Loubet (FR)

(73) Assignee: NXP B.V., Eindhoven (NL)

( * ) Notice: Subject to any disclaimer, the term of this patent is extended or adjusted under 35 U.S.C. 154(b) by 732 days.

(21) Appl. No.: 11/547,739

(22) PCT Filed: Mar. 22, 2005

(86) PCT No.: PCT/IB2005/050972

§ 371 (c)(1),
(2), (4) Date: Oct. 6, 2006

(87) PCT Pub. No.: WO2005/099163

PCT Pub. Date: Oct. 20, 2005

(65) Prior Publication Data

US 2007/0258547 A1    Nov. 8, 2007

(30) Foreign Application Priority Data

Apr. 8, 2004    (EP) .................................. 04300186

(51) Int. Cl.
*H03D 1/04*    (2006.01)

(52) U.S. Cl. ...................... 375/346; 375/316; 375/146; 375/140; 375/147; 375/343; 375/295; 375/296; 375/297

(58) Field of Classification Search .................. 375/346, 375/316, 146, 140, 147, 343, 295, 296, 297
See application file for complete search history.

(56) References Cited

U.S. PATENT DOCUMENTS

| | | | | |
|---|---|---|---|---|
| 7,184,497 | B2 * | 2/2007 | Jeske et al. | 375/346 |
| 2002/0176516 | A1 * | 11/2002 | Jeske et al. | 375/316 |
| 2003/0016740 | A1 * | 1/2003 | Jeske et al. | 375/227 |
| 2003/0087660 | A1 * | 5/2003 | Sendonaris | 455/522 |
| 2003/0153277 | A1 * | 8/2003 | Ito et al. | 455/69 |

FOREIGN PATENT DOCUMENTS

| | | |
|---|---|---|
| EP | 1 337 054 | 8/2003 |
| JP | 2003-319447 A | 7/2003 |
| JP | 2004-517551 A | 6/2004 |

(Continued)

OTHER PUBLICATIONS

Jeske D R et al: "Signal-to-Interference Ratio Estimation Based on Decision Feedback"; VTC 2001 Spring. IEEE VTS 54RD, Vehicular Tech. Conference. Rhodes Greece May 6-9, 2001. IEEE Vehicular Tech. Conf. New York vol. 4 of 4, Conf 53, May 6, 2001. pp. 2484-2488.

(Continued)

*Primary Examiner*—David C Payne
*Assistant Examiner*—Zewdu Kassa (57) ABSTRACT

An overall SIR estimate is based on a weighted-average of different SIR estimates, wherein the weights are chosen to minimize the mean-square-error (MSE) of the overall SIR estimate. Alternatively, the overall SIR estimate is based on a selection from among the different SIR estimates, based on the expected reliability of each SIR estimate. The expected reliability of each SIR estimate may be based on the current format of the transmitted signal and/or a prior estimated SIR level.

20 Claims, 4 Drawing Sheets

FOREIGN PATENT DOCUMENTS

WO 02/054637 A2 7/2002

OTHER PUBLICATIONS

Ashwin Sampath and Daniel R. Jeske; "Analysis of Signal-to-Interference Ratio Estimation Methods for Wireless Communication Systems," IEEE International Conference on Communications (ICC) 2001, pp. 2499-2503, vol. 8.

Office Action in Japanese Patent Appln. No. 2007-506872 (Aug. 6, 2010).

* cited by examiner

| Format | $N_{Data1}$ | $N_{Data2}$ | $N_{Pilot}$ | $(N_{data1}+N_{data2})/N_{pilot}$ | COHERENT | NON-COH |
|---|---|---|---|---|---|---|
| 0 | 0 | 4 | 4 | 1.00 | on | off |
| 0A | 0 | 4 | 4 | 1.00 | on | off |
| 0B | 0 | 8 | 8 | 1.00 | on | off |
| 1 | 0 | 2 | 4 | 0.50 | on | off |
| 1B | 0 | 4 | 8 | 0.50 | on | off |
| 2 | 2 | 14 | 2 | 8.00 | off | on |
| 2A | 2 | 14 | 2 | 8.00 | off | on |
| 2B | 4 | 28 | 4 | 8.00 | off | on |
| 3 | 2 | 12 | 2 | 7.00 | off | on |
| 3A | 2 | 10 | 2 | 6.00 | off | on |
| 3B | 4 | 24 | 4 | 7.00 | off | on |
| 4 | 2 | 12 | 4 | 3.50 | off | on |
| 4A | 2 | 12 | 4 | 3.50 | off | on |
| 4B | 4 | 24 | 8 | 3.50 | on if SIR<2dB | on if SIR>2dB |
| 5 | 2 | 10 | 4 | 3.00 | off | on |
| 5A | 2 | 8 | 4 | 2.50 | off | on |
| 5B | 4 | 20 | 8 | 3.00 | on if SIR<2dB | on if SIR>2dB |
| 6 | 2 | 8 | 8 | 1.25 | on if SIR<6dB | on if SIR>6dB |
| 6A | 2 | 8 | 8 | 1.25 | on if SIR<6dB | on if SIR>6dB |
| 6B | 4 | 16 | 16 | 1.25 | on if SIR<6dB | on if SIR>6dB |
| 7 | 2 | 6 | 8 | 1.00 | on | off |
| 7A | 2 | 4 | 8 | 0.75 | on | off |
| 7B | 4 | 12 | 16 | 1.00 | on | off |
| 8 | 6 | 28 | 4 | 8.50 | off | on |
| 8A | 6 | 28 | 4 | 8.50 | off | on |
| 8B | 12 | 56 | 8 | 8.50 | off | on |
| 9 | 6 | 26 | 4 | 8.00 | off | on |
| 9A | 6 | 24 | 4 | 7.50 | off | on |
| 9B | 12 | 52 | 8 | 8.00 | off | on |
| 10 | 6 | 24 | 8 | 3.75 | on if SIR<2dB | on if SIR>2dB |
| 10A | 6 | 24 | 8 | 3.75 | on if SIR<2dB | on if SIR>2dB |
| 10B | 12 | 48 | 16 | 3.75 | on if SIR<3dB | on if SIR>3dB |
| 11 | 6 | 22 | 8 | 3.50 | on if SIR<2dB | on if SIR>2dB |
| 11A | 6 | 20 | 8 | 3.25 | on if SIR<2dB | on if SIR>2dB |
| 11B | 12 | 44 | 16 | 3.50 | on if SIR<3dB | on if SIR>3dB |
| 12 | 12 | 48 | 8 | 7.50 | off | on |
| 12A | 12 | 40 | 8 | 6.50 | off | on |
| 12B | 24 | 96 | 16 | 7.50 | on if SIR<2dB | on if SIR>2dB |
| 13 | 28 | 112 | 8 | 17.50 | off | on |
| 13A | 28 | 104 | 8 | 16.50 | off | on |
| 13B | 56 | 224 | 16 | 17.50 | on if SIR<2dB | on if SIR>2dB |
| 14 | 56 | 232 | 16 | 18.00 | on if SIR<2dB | on if SIR>2dB |
| 14A | 56 | 224 | 16 | 17.50 | on if SIR<2dB | on if SIR>2dB |
| 14B | 112 | 464 | 32 | 18.00 | on if SIR<3dB | on if SIR>3dB |
| 15 | 120 | 488 | 16 | 38.00 | on if SIR<2dB | on if SIR>2dB |
| 15A | 120 | 480 | 16 | 37.50 | on if SIR<2dB | on if SIR>2dB |
| 15B | 240 | 976 | 32 | 38.00 | on if SIR<3dB | on if SIR>3dB |
| 16 | 248 | 1000 | 16 | 78.00 | on if SIR<2dB | on if SIR>2dB |
| 16A | 248 | 992 | 16 | 77.50 | on if SIR<2dB | on if SIR>2dB |

FIG. 6

COMBINING SIGNAL-INTERFERENCE-RATIO (SIR) ESTIMATES FOR IMPROVED SIR ESTIMATION

This invention relates to the field of communication systems, and in particular to a communications device that determines a signal-to-interference ratio (SIR) measure from a variety of different SIR measures.

Wireless communication systems are often configured to provide efficient communications using minimal transmission power among the transmitters. Reduced transmission power provides for reduced power consumption, and thereby increased battery life. Reduced transmission power also provides for reduced levels of interference among transmitters. Optimally, each transmitter in a wireless communication system would be configured to transmit at a minimized power level that provides for reliable communication at the receiver. This minimum transmission power level is a function of the losses in the path between the transmitter and the receiver, as well as the amount of interference from other sources that is added to the received signal.

A common technique for optimizing transmission power in a communications system is a feedback loop, wherein the receiver notifies the transmitter of its ability to reliably receive each transmission, and the transmitter adjusts its transmit power accordingly. If the receiver reports that the received signal is not at a sufficient level to effect reliable decoding of the transmitted signal, the transmitter increases its transmit power; if the receiver reports more than a sufficient level to effect reliable decoding, the transmitter decreases its transmit power, until the receiver reports an insufficient level, at which point the transmit power is increased. Eventually, the transmitter power is adjusted to the transition point between sufficient and insufficient power, thereby providing the minimum transmit power required to communicate reliably.

For a receiver-transmitter power-control feedback technique to work properly, the receiving system must provide an accurate assessment of the sufficiency of the received signal strength. A common measure of a receiver's ability to effectively decode a transmitted-signal is the ratio of the received transmitted-signal strength (S) to the total received interference/noise strength (I), this ratio being commonly termed a signal-to-interference ratio (SIR). Typically, the SIR can be estimated by a variety of techniques, depending, for example, on whether the transmitter is transmitting a known signal (e.g. pilot symbols), or unknown signals (e.g. data symbols), and/or on the techniques used to distinguish the transmitted signal from the interference.

It is an object of this invention to provide a method and system for accurately estimating the signal to interference ratio (SIR) of a received signal. It is a further object of this invention to provide a method and system for estimating an SIR based on a plurality of SIR estimates.

These objects and others are achieved using a variety of techniques. In a first embodiment of this invention, an overall SIR estimate is based on a weighted-average of different SIR estimates, wherein the weights are chosen to minimize the mean-square-error (MSE) of the overall SIR estimate. In another embodiment of this invention, the overall SIR estimate is based on a selection from among the different SIR estimates, based on the expected reliability of each SIR estimate. In an example embodiment, the expected reliability of each SIR estimate is based on the current format of the transmitted signal.

A drawing is included for illustrative purposes and is not intended to limit the scope of the invention. In the drawing:

FIG. 6 illustrates an example table for controlling an SIR estimator based on the format of the received signal in accordance with this invention.

Throughout the drawing, the same reference numeral refers to the same element, or an element that performs substantially the same function.

For ease of understanding, this invention is hereinafter presented using the paradigm of a UMTS-compatible transceiver 100. As is known in the art, the UMTS standard is a commonly-used standard for wireless communications, the details of which are provided, for example, in the "3GPP Technical Specifications, Release 99" as published by the $3^{rd}$ Generation Partnership Project (3GPP) Organization Partners, Valbonne, France. One of ordinary skill in the art will recognize, however, that the principles presented herein are substantially independent of a particular protocol.

Figure 1:
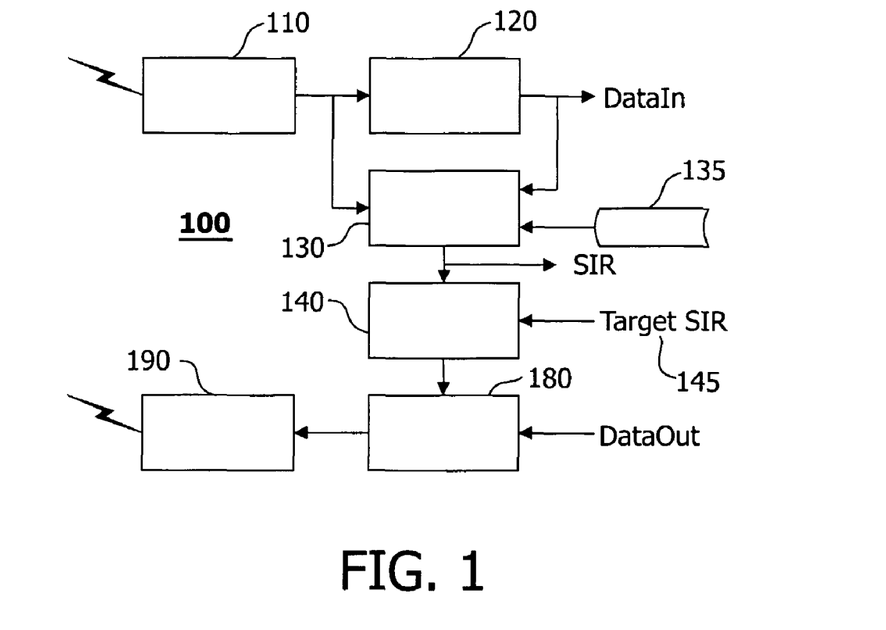
FIG. 1 illustrates an example receiver-transmitter in accordance with this invention.

FIG. 1 illustrates an example transceiver 100 in accordance with this invention. The transceiver 100 includes a receiver 110, commonly termed an "inner receiver" or "equalizer", that is configured to receive a modulated signal from a remote device (not shown) and to provide a demodulated signal to a decoder 120, commonly termed an "outer receiver". The receiver 110 is configured to provide channel equalization, to compensate for undesirable propagation-channel effects, and to mitigate interference effects, so that the performance of the decoder 120 can be optimized. The aforementioned signal-to-interference-ratio, SIR, is a measure of the effectiveness of this channel equalization, and corresponds to the ratio of the signal strength of the desired signal to the signal strength of the interference at the output of the receiver 110.

An SIR estimator 130 is configured to determine an estimate of the SIR from the output of the receiver 110. A primary use of the SIR is to control the power from the remote device to the receiver 110. As such, the output of the SIR estimator 130 is provided to a power feedback controller 140 that compares the estimated SIR to a target SIR 145. The target SIR is typically defined as the minimum SIR required to achieve a given bit-error-rate (BER) at the output of the decoder 120. Based on this comparison, the power feedback controller 140 communicates a message to the remote device, via an encoder 180 and transmitter 190, to effect an increase or decrease of the power output of the remote device for subsequent transmission to this transceiver 100, if required, to achieve the target SIR 145. Optionally, the remote device may communicate similar messages to the transceiver 100, based on an SIR determined at the remote device, to effect a similar control of the power output of the transmitter 190 to achieve a target SIR at the remote device.

Figure 2:
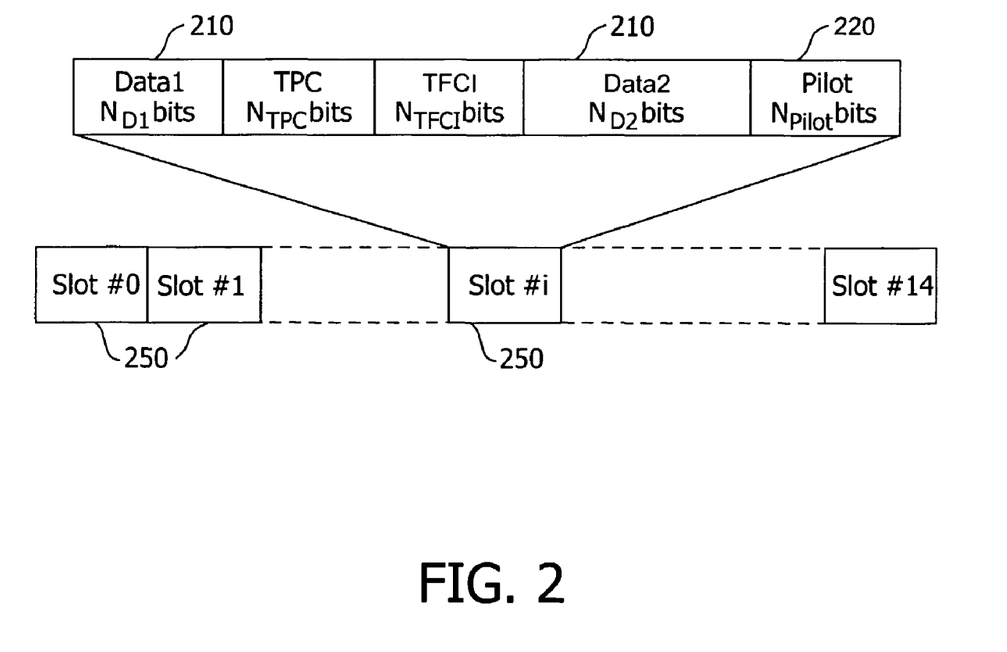
FIG. 2 illustrates an example UMTS compatible transmission stream.

FIG. 2 illustrates an example UMTS compatible transmission stream, as transmitted from a base station to a user's equipment ("node B" and "UE", respectively, in the 3GPP Technical Specifications). The user's equipment UE in a typical embodiment corresponds to a user's mobile phone. FIG. 2 illustrates a frame structure comprised of fifteen slots 250, each slot comprising data bits (Data1 and Data2) 210 and control bits (TPC, TFCI, and Pilot 220). The 3GPP specification provides for dozens of different formats, each format specifying the number of bits allocated to each of the Data1, Data2, TPC, TFCI, and Pilot fields within the slots of the frame. The 3GPP specification also defines the bit-patterns of the Pilot bits within each slot. Thus, each slot contains a predefined number of data bits ($N_{D1}+N_{D2}$), whose values are unknown to the receiver, and a predefined number of pilot bits ($N_{Pilot}$), whose values, being defined in the 3GPP specification, are known to the receiver. In FIG. 1, known pilot symbols at the receiver are illustrated as data set PSym 135.

As detailed further below, the SIR estimator 130 is preferably configured to determine at least three estimates of SIR, based upon the receipt of a transmission stream:

a coherent estimate, based on the characteristics of differences between known transmitted signals and received transmitted signals, a non-coherent estimate, based on the characteristics of unknown transmitted signals and received transmitted signal, and a decision-feedback estimate, based on the characteristics of differences between decoded (decided) albeit unknown transmitted signals and the received transmitted signal.

Coherent Estimate: As is well known in the art, the received interference can be more easily/reliably distinguished from the received transmitted signal if the original transmitted signal, such as the pilot signal, is known at the receiver. Effectively, the variance of the difference between the received transmitted signal and the known transmitted signal corresponds to the interference.

Non-coherent Estimate: If the transmitted signal is unknown, such as when data is being received at the receiver, distinguishing between the received transmitted signal and interference is more difficult and/or less reliable, because at least a portion of the variance associated with the received signal will include a variance corresponding to transitions of the transmitted data.

Decision-feedback Estimate: To reduce the effects of the variance corresponding to transition of the transmitted data, the decoded values of the received data from the decoder 120 of FIG. 1 may be fed back to the receiver 110, and used as "assumed-known" transmitted signal values for comparison with stored/delayed values of the received signal to determine the interference present at the received signal that produced this assumed-known value. That is, the variance of the difference between the received transmitted signal and the subsequently determined assumed-known transmitted signal is factored out of the variance of the received signal to determine the variance corresponding to the interference.

One of ordinary skill in the art will recognize that other schemes for estimating SIRs may be employed, depending upon the degree of information that is known a priori, and depending upon the techniques used to distinguish interference from desired signals, as well as other factors. For ease of understanding, the invention is presented in the context of the above three techniques for distinguishing interference and thereby estimating a signal to interference ratio, SIR, for each.

Figure 3:
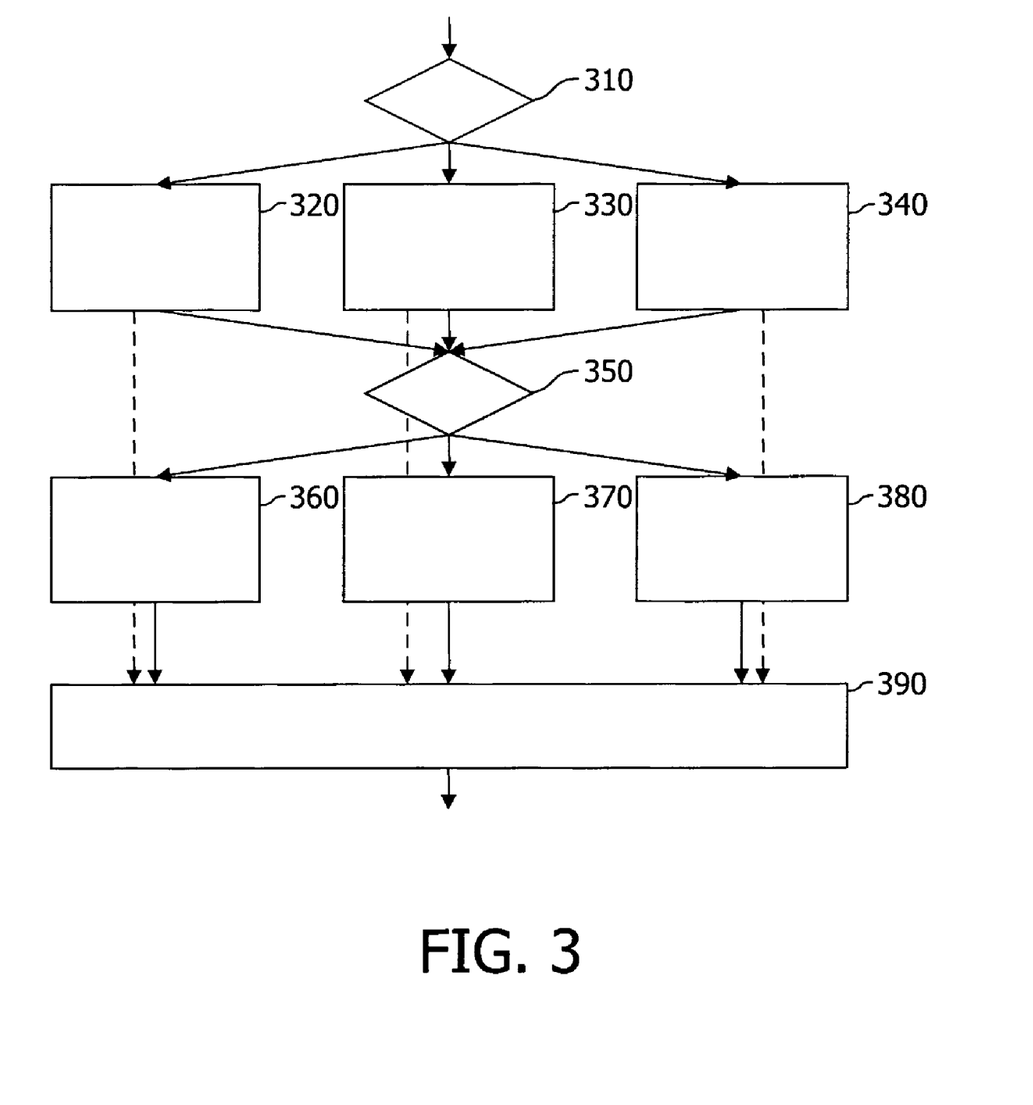
FIG. 3 illustrates an example flow diagram of an SIR estimator in accordance with this invention.

FIG. 3 illustrates an example flow diagram of an SIR estimator in accordance with this invention. At 310, the type of SIR estimator is determined, based on the available input. If known pilot signals are being processed, a coherent SIR is determined, at 320. If data signals are being processed, either a non-coherent or a decision-feedback SIR, or both, is determined, at 330, 340, respectively.

In the general case, a received signal at the output of the receiver 110 of FIG. 1 is defined as:

$$r[n]=\alpha[n]s[n]+v[n] \quad (1)$$

where s[n] represents information signal from the remote device, α[n] represents the amplitude of the information signal after it is communicated from the remote device to the transceiver 100, and v[n] represents the part of the received signal that corresponds to the interference. Generally, the average signal to interference ratio, SIR, can be defined as:

$$\gamma_{avg} = \frac{E\{|\alpha[n]|^2\}}{E\{|v[n]|^2\}}, \quad (2)$$

where E{.} denotes the expectation operator.

Assuming that the noise plus interference is modeled as additive white Gaussian noise (AWGN), the estimate of the SIR at time k can be defined as:

$$\hat{\gamma}(k) = \frac{|\hat{\mu}(k)|^2}{\hat{\sigma}^2(k)}, \quad (3)$$

where $\hat{\mu}(k)$ represents the estimate of the amplitude of the information signal, the square of which represents the estimate of the signal power, and $\hat{\sigma}^2(k)$ represents the estimate of the power of the noise plus interference.

Under the assumption of zero-mean white Gaussian interference-plus-noise, the estimate $\hat{\sigma}^2(k)$ can be expressed, for example, by the maximum likelihood or sample variance estimators, i.e.

$$\hat{\sigma}^2(k) = \frac{1}{N}\sum_{n=k}^{k+N-1}|r[n]-\hat{\mu}(k)|^2 \text{ or } \hat{\sigma}^2(k) = \frac{1}{N-1}\sum_{n=k}^{k+N-1}|r[n]-\hat{\mu}(k)|^2 \quad (4)$$

respectively, where N is the number of received symbols used to determine $\hat{\mu}(k)$, which in turn can be expressed, for example, by the sample-mean estimator as detailed below.

If the processed information includes known information signals, s, an estimate of the average amplitude of the information signal can be expressed as:

$$\hat{\mu}_{coh}(k) = \frac{1}{N_{coh}}\sum_{n=k}^{k+N_{coh}-1} \text{Re}\{s^*_{coh}[n]r[n]\} \quad (5)$$

$$= \frac{1}{N_{coh}}\sum_{n=k}^{k+N_{coh}-1} \text{Re}\{s^*_{coh}[n](\alpha[n]s_{coh}[n]+v[n])\},$$

where the superscript "*" denotes complex conjugate, and the "coh" subscript represents the known transmitted signals that provide the coherent estimate $SIR_{coh}$. Under the assumption of zero-mean white Gaussian interference-plus-noise, the estimator above is proven to be the maximum likelihood estimator.

If the processed information includes unknown information symbols, the estimate of the average amplitude of the information signal can be defined as in the particular case of a QPSK symbol constellation:

$$\hat{\mu}_{incoh}(k) = \frac{1}{N_{incoh}} \sum_{n=k}^{k+N_{incoh}-1} \frac{1}{\sqrt{2}} (|\text{Re}\{r[n]\}| + |\text{Im}\{r[n]\}|), \quad (6)$$

where the "incoh" subscript represents the unknown transmitted signals that provide the estimate of the non-coherent estimate $SIR_{incoh}$. A similar approach for any constant modulus symbol constellation, such as for example 8-PSK, leads to $$\hat{\mu}_{incoh}(k) = \frac{1}{N_{incoh}} \sum_{n=k}^{k+N_{incoh}-1} |r[n]| \quad (7)$$

$$= \frac{1}{N_{incoh}} \sum_{n=k}^{k+N_{incoh}-1} \sqrt{\text{Re}\{r[n]\}^2 + \text{Im}\{r[n]\}^2}$$

If the processed information includes "decided", or "predicted, or "decoded", or "assumed-known" information signals, ŝ(n), the estimate of the average amplitude of the information signal can be defined as:

$$\hat{\mu}_{df}(k) = \frac{1}{N_{df}} \sum_{n=k}^{k+N_{df}-1} \text{Re}\{\hat{s}^*[n]r[n]\} \quad (8)$$

$$= \frac{1}{N_{df}} \sum_{n=k}^{k+N_{df}-1} \text{Re}\{\hat{s}^*[n](\alpha[n]s[n] + v[n])\},$$

where the "df" subscript stands for "decision-feedback" and represents the decoded/predicted/decided/assumed-known symbols corresponding to unknown transmitted symbols that provide the decision-feedback estimate $SIR_{df}$. In an embodiment of this invention, the decision feedback mechanism may consist of building the "decided" symbols, ŝ(n), and forming the hard-decision estimates prior the data decoding, as well-known to one of ordinary skill in the art. This approach has the advantage of avoiding the processing delay and the computational complexity involved by the decoding the received data symbols at the expense of a reduced reliability of the decided symbols ŝ(n).

Due to the limited number of samples available to compute each of the estimates, each estimated SIR may exhibit inaccuracies and biases. Techniques such as smoothing, optimal general Wiener filtering (forward, backward, and forward back-ward linear prediction), for both signal amplitude and interference-plus-noise power, and bias compensation may be employed to improve the accuracy of each estimate. Regardless of the particular smoothing, prediction-filtering and bias correction technique used, the general scheme can be described as a method of estimating a current parameter based on a series of parameter estimates.

In general, regardless of the filtering and bias-correcting techniques employed, the SIR estimate at time-slot k takes on the form $$\tilde{\gamma}(k) = \frac{|\tilde{\mu}(k)|^2}{\tilde{\sigma}^2(k)}, \quad (9)$$

where the symbol represents an estimate obtained from one or more other estimates via a properly chosen filtering technique. Equation (9) implicitly takes into account also the compensation of the estimation bias and applies to each of the aforementioned coherent, incoherent, and decision-feedback SIR estimators.

That is, at the output of block 320:

$$\tilde{\gamma}_{coh}(k) = \frac{|\tilde{\mu}_{coh}(k)|^2}{\tilde{\sigma}^2_{coh}(k)}; \quad (10)$$

at the output of block 330:

$$\tilde{\gamma}_{incoh}(k) = \frac{|\tilde{\mu}_{incoh}(k)|^2}{\tilde{\sigma}^2_{incoh}(k)}; \quad (11)$$

and at the output of block 340:

$$\tilde{\gamma}_{df}(k) = \frac{|\tilde{\mu}_{df}(k)|^2}{\tilde{\sigma}^2_{df}(k)}. \quad (12)$$

Note that the techniques used to smooth/filter and bias-correct each of the terms need not be the same. For example, although the estimate of the signal-plus-interference term $\hat{\sigma}^2(i)$ may vary slowly, and thus be suitable for long-term smoothing, the amplitude of the information signal may vary more quickly, and the estimated amplitude $\tilde{\mu}(k)$ may be based solely on the most recent sample estimate $\hat{\mu}(k)$ if suited filtering is not feasible due to complexity limitations.

Composite MSE Measurement Based SIR Estimation

At block 390 in FIG. 3, the composite SIR is determined, using for example, the following definition:

$$\tilde{\gamma}_{tot}(k) = \alpha_1 \tilde{\gamma}_{coh}(k) + \alpha_2 \tilde{\gamma}_{incoh}(k) + \alpha_3 \tilde{\gamma}_{df}(k), \quad (13)$$

where $\alpha_1$, $\alpha_2$, and $\alpha_3$ are defined weights associated with each of techniques used to estimate the SIR. The weights are to be defined in order for the accuracy of $\tilde{\gamma}_{tot}(k)$ to be optimized. Accordingly, in general the higher the accuracy of a certain estimate among $\tilde{\gamma}_{coh}(k)$, $\tilde{\gamma}_{incoh}(k)$, $\tilde{\gamma}_{df}(k)$, the larger will be the corresponding weight. The accuracy of an estimate is dependent upon the number of samples used to determine the estimate, as well as the actual SIR being estimated and the estimation technique. For example, the coherent estimate is generally more reliable than the incoherent and decision-feedback estimates, for the same number of samples. However since the number of a-priori known symbols is generally fairly limited in practical systems (e.g. about 20% on average of a slot period within the UMTS standard) compared to the number unknown data symbols, carrying the actual transmitted information, there are circumstances where other SIR estimators based on a-priori unknown symbols yield a more accurate SIR estimate than the coherent SIR estimator.

In accordance with one aspect of this invention, the mean-square-error is used as the accuracy metric to be optimized. Hence the coefficients $\alpha_1$, $\alpha_2$, and $\alpha_3$ are chosen in order to minimize the mean-square-error (MSE) of the SIR estimate, i.e. to minimize MSE=$E\{|\tilde{\gamma}_{tot}(k)-\gamma(k)|^2\}$. For this purpose, the MSE of each involved SIR estimate is needed. The choice of using this technique is illustrated at block 350 of FIG. 3. At each block 360, 370, 380, the mean-square-error of the corresponding SIR estimate $\tilde{\gamma}_{coh}(k)$, $\tilde{\gamma}_{incoh}(k)$, and $\tilde{\gamma}_{df}(k)$ is determined, denoted hereinafter as $MSE_1$, $MSE_2$, and $MSE_3$ respectively. It can be shown that the optimal weighting coefficients $\alpha_1$, $\alpha_2$, and $\alpha_3$ that minimize the MSE $E\{|\tilde{\gamma}_{tot}(k)-\gamma(k)|^2\}$ of $\tilde{\gamma}_{tot}(k)$ are given by $$a_1 = \frac{MSE_2 MSE_3}{MSE_1 + MSE_2 + MSE_3}, \quad (14a)$$

$$a_2 = \frac{MSE_1 MSE_3}{MSE_1 + MSE_2 + MSE_3}, \quad (14b)$$

$$a_3 = \frac{MSE_1 MSE_2}{MSE_1 + MSE_2 + MSE_3}. \quad (14c)$$

However, the $MSE_1$, $MSE_2$, and $MSE_3$ necessary to compute the optimal weighting coefficients $\alpha_1$, $\alpha_2$, and $\alpha_3$ depend on the actual SIR to be estimated, so that the quantities $MSE_1$, $MSE_2$, and $MSE_3$ are also to be estimated. In accordance with another aspect of this invention, each SIR estimator's MSE can be approximated by the variance of the corresponding SIR estimate. Preferably, appropriate smoothing/filtering or bias correction is performed in order to render the estimation bias negligible.

To provide a measure of the variance of the SIR estimate, the sample variance can be used; that is, for any of the three estimators we have $$MSE \approx \mathrm{Var}(\tilde{\gamma}(k)) \approx \frac{1}{L-1}\sum_{l=1}^{L}|\tilde{\gamma}(l)-\bar{\tilde{\gamma}}_L|^2 \quad (15)$$

where $$\bar{\tilde{\gamma}}_L = \frac{1}{L}\sum_{l=1}^{L}\tilde{\gamma}(l)$$

represents the sample mean and L denotes the number of sample periods, taken into account for the MSE estimation. Each of the blocks 360, 370, 380 provides an MSE estimate per equation (16) to the block 390 for a determination of the composite SIR.

In this example embodiment, upon receipt of the MSE estimates, the block 390 determines the optimal coefficients $\alpha_1$, $\alpha_2$, and $\alpha_3$ as detailed above. Thereafter, the block 390 applies equation (13) to form the composite SIR based on these optimal coefficients.

The determination of three MSE's and three coefficients for determining the composite SIR as defined above may consume excessive computational resources. In an alternative embodiment of this invention, in order to reduce the computational complexity, the combination of the SIR estimates in equation (13) is limited to two terms, by selecting the two estimates of the SIR with the lowest MSE. In this case the SIR estimate takes the form $$\tilde{\gamma}_{tot}(k)=\alpha_1\tilde{\gamma}_{coh}(k)+\alpha_2\tilde{\gamma}_{incoh}(k) \text{ if } MSE_1, MSE_2 > MSE_3$$
$$\text{or} \quad (16a)$$

$$\tilde{\gamma}_{tot}(k)=\alpha_1\tilde{\gamma}_{coh}(k)+\alpha_3\tilde{\gamma}_{df}(k) \text{ if } MSE_1, MSE_3 > MSE_2 \text{ or} \quad (16b)$$

$$\tilde{\gamma}_{tot}(k)=\alpha_2\tilde{\gamma}_{incoh}(k)+\alpha_3\tilde{\gamma}_{df}(k) \text{ if } MSE_3, MSE_2 > MSE_1 \quad (16c)$$

where the MSE's are estimated e.g. by applying equation (15). The corresponding coefficients are given by $$a_1 = \frac{MSE_2}{MSE_1 + MSE_2}, \text{ and} \quad (17a)$$

$$a_2 = 1 - a_1 = \frac{MSE_1}{MSE_1 + MSE_2} \quad (17b)$$

$$a_1 = \frac{MSE_3}{MSE_1 + MSE_3}, \text{ and} \quad (18a)$$

$$a_3 = 1 - a_1 = \frac{MSE_1}{MSE_1 + MSE_3} \quad (18b)$$

$$a_2 = \frac{MSE_3}{MSE_2 + MSE_3}, \text{ and} \quad (19a)$$

$$a_3 = 1 - a_2 = \frac{MSE_2}{MSE_2 + MSE_3} \quad (19b)$$

respectively, where we constrained, without loss of generality, $\alpha_1+\alpha_2=1$, $\alpha_1+\alpha_3=1$, $\alpha_2+\alpha_3=1$ in equations (16a), (16b), and (16c) respectively.

In this example embodiment, upon receipt of the MSE estimates, the block 390 computes the coefficients of corresponding to the two selected estimators according to equations (17a)-(17b), (18a)-(18b), or (19a)-(19b), and set the other coefficient equal to zero.

In another alternative embodiment of the invention in order to further reduce the computational complexity, the SIR estimate in equation (13) is limited to a single term, by selecting the estimate of the SIR with the lowest MSE. In this example embodiment, upon receipt of the MSE estimates, the block 390 selects the estimator by setting the corresponding coefficient equal to 1 and the other coefficients equal to zero.

Threshold Based Sir Estimation

As noted above, the coherent SIR estimator always yields to more accurate estimates than the incoherent and the decision-feedback SIR estimators for the same number of samples. However, if the number of a-priori known symbols is significantly smaller than the number of unknown data symbols, the accuracy of the coherent SIR estimates can be significantly lower than the accuracy of the SIR estimates of the incoherent and decision-feedback SIR estimates, particularly when the SIR is high and the incoherent and decision-feedback SIR estimates exhibit greater accuracy. Unfortunately, the accuracy of both the incoherent and the decision-feedback estimates becomes unacceptably low as the SIR decreases. Hence, in order to achieve the maximum accuracy over the widest possible SIR range, an optimal strategy will lead to the use of all three estimators to form a combined estimate, as previously detailed.

In order to reduce the computational complexity, an alternative approach is presented that avoids the estimation of the MSE's associated with all three SIR estimates and exploits other characteristics of the involved SIR estimators.

In this embodiment of the invention, the coherent estimator is always enabled in order to allow accurate estimates at low SIR.

At mid-to-low SIR, the decision-feedback SIR estimator generally outperforms the incoherent SIR estimator for the same number of samples/symbols. That is, at mid-to-low SIR, the SIR estimate based on assumed known (or decided or predicted) information symbols is generally less error prone than a incoherent SIR estimate, relying on the constant modulus structure of the transmit symbol constellation. Although the decided information signal may be erroneous at low signal to interference levels, the overall accuracy of the decision-feedback estimate is generally better than the incoherent estimate, the latter being affected by a large estimation bias (see, for example, the hereby-incorporated reference: A. Sampath and D. R. Jeske, "Analysis of signal-to-interference ratio estimation methods for wireless communication systems," Proc. of IEEE ICC 2001, and A. Sampath and D. R. Jeske, "Signal-to-interference ratio estimation based on decision feedback," proc. of IEEE VTC Spring 2001).

At moderate and high SIR, the incoherent SIR estimator generally outperforms the decision-feedback SIR estimator for the same number of samples/symbols. When the SIR increases, the incoherent SIR estimator bias dissipates more quickly than the effect if the incorrect decision in the decision-feedback SIR estimation.

Based on those considerations, in accordance with another aspect of this invention, only one of the incoherent and decision-feedback based SIR estimates is to selected for combining, thereby reducing the computational complexity. For this purpose, one can select the decision-feedback or the incoherent estimator based on previous SIR estimates. If the previous SIR estimate is low, the decision-feedback estimator is enabled; if the previous SIR estimate is moderate or high, the incoherent estimator is enabled.

Thus, in accordance with this other aspect of this invention, the sum in equation (13) can be reduced to the following:

$$\tilde{\gamma}_{tot}(k)=\alpha_1\tilde{\gamma}_{coh}(k)+\alpha_2\tilde{\gamma}_{incoh}(k), \text{ for } \gamma(k) \geq X, \text{ and} \quad (20a)$$

$$\tilde{\gamma}_{tot}(k)=\alpha_1\tilde{\gamma}_{coh}(k)+\alpha_3\tilde{\gamma}_{df}(k), \text{ for } \gamma(k) < X, \quad (20b)$$

where X is a threshold level of SIR below which the decision-feedback SIR estimator outperforms the incoherent SIR estimator. Generally, X is selected at a level wherein the incoherent SIR estimator provides negligible contribution to improving the SIR estimate accuracy. In order to select either the incoherent or the decision-feedback SIR estimator in accordance with equations (20a)-(20b) one may proceed by replacing in these equations the actual SIR $\gamma(k)$ with a previous, even rough, SIR estimate, provided by one or a combination of several SIR estimates, as detailed above. In accordance with this aspect of the invention, in order to save computation time and resources, the decision-feedback SIR estimate as well as the corresponding MSE are not computed when the (estimated) SIR is above the threshold level, based on the prior estimated SIR. Conversely the incoherent SIR estimate as well as the corresponding MSE are not computed when the (estimated) SIR is below the threshold level, based on the prior estimated SIR. The coefficients needed to compute the equations (20a) and (20b) are given by equations (17a)-(17b), and (18a)-(18b) respectively.

Figure 4:
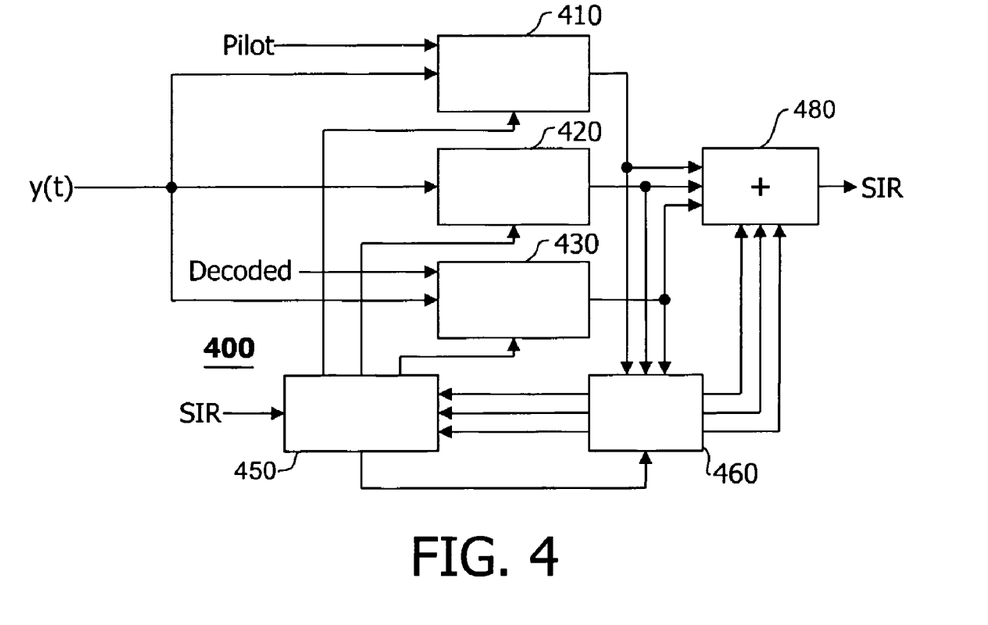
FIG. 4 illustrates an example embodiment of an SIR estimator based on a plurality of SIR estimates in accordance with this invention.

FIG. 4 illustrates an example embodiment of an SIR estimator 400 based on a plurality of SIR estimates as detailed above. The received signal is provided to each of the coherent estimator 410, incoherent estimator 420, and decision-feedback estimator 430. A controller 450 selectively controls each of these estimators, as well as controlling an MSE estimator 460.

In one embodiment of this invention, each of the estimators 410, 420, 430 is enabled to provide an estimate to a combiner 480. The combiner 480 determines a composite/total SIR estimate, preferably using equation (13), above. As noted above, the weighting coefficients $\alpha_1$, $\alpha_2$, and $\alpha_3$ may be defined based on the assumed or estimated reliability of each SIR estimate. Preferably, however the coefficients $\alpha_1$, $\alpha_2$, and $\alpha_3$ are determined based on estimates of the MSE associated with each of the SIR estimates from the MSE estimator 460, preferably using equations (14) and (15a)-(15c) eventually constraining $\alpha_1+\alpha_2+\alpha_3=1$.

In another embodiment of the invention, to save computation time and resources, only the two estimators associated with the lowest MSE's are enabled out of the three estimators, where the MSE's are to be estimated (e.g. by mean of equation (15)).

In another embodiment of the invention, to save computation time and resources, the decision-feedback estimator 430 or the non-coherent estimator 420 is only enabled only if the SIR is below or above a given threshold value respectively, based on prior estimates of the SIR.

When the (estimated) SIR is above the given threshold, the combiner 480 is configured to estimate the SIR based on equations (20a) and (17a)-(17b) above, using the MSE estimates from the MSE estimator 460. During this period, the controller 450 also controls the MSE estimator 460 to only estimate the MSE associated with the coherent and non-coherent SIR estimates.

When the (estimated) SIR is below the given threshold level, the combiner 480 is configured to estimate the SIR based on equations (20b) and (18a)-(18b) above, using the MSE estimates from the MSE estimator 460. During this period, the controller 450 also controls the MSE estimator 460 to only estimate the MSE associated with the coherent and decision-feedback SIR estimates.

Figure 5:
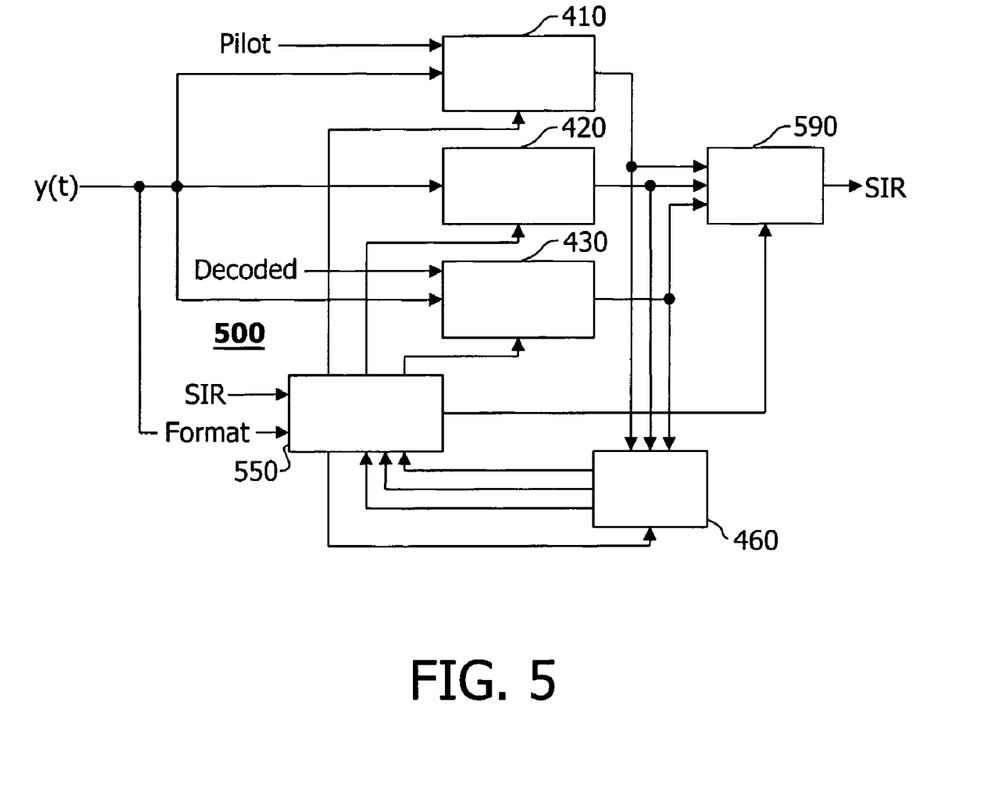
FIG. 5 illustrates another example embodiment of an SIR estimator based on a plurality of SIR estimates in accordance with this invention.

FIG. 5 illustrates another example embodiment of an SIR estimator 500 based on a plurality of SIR estimates in accordance with this invention. In this embodiment, a controller 550 controls the determination of the composite SIR estimate based on the knowledge of the current slot-format of the incoming discrete-time signal r[n] as well as on the SIR level. The a-priori knowledge of the current slot-format can be exploited to reduce the computational complexity.

As noted above, the slot-format typically defines the number of pilot symbols relative to the number of data symbols. As previously mentioned, the reliability/accuracy of an estimate generally increases with the number of samples used to determine the estimate. Thus, even though a coherent estimate is generally more reliable than an non-coherent or decision-feedback estimate, given the same number of samples to determine each, the reliability of the non-coherent and the decision-feedback estimates may be greater than the coherent estimate if the non-coherent and the decision-feedback estimates are based on more samples than the coherent estimate, provided that the SIR is above a certain level. As also noted above, the non-coherent estimator is shown to outperform the decision-feedback estimator at moderate to high SIR.

On the basis of the above considerations, in order to minimize the computational complexity, in this embodiment of the invention, only the most accurate SIR estimate is selected, thereby avoiding the computation of the associated MSE's. Thus, if a particular format includes substantially more data symbols than pilot symbols, and, on the basis of previous, even rough, SIR estimates, the actual SIR is likely to be above or below a certain threshold, the controller 550 may be configured to disable the coherent estimator 410, and to control a selector 590 to use the output of one of the SIR estimators 420, 430 based on the data symbols alone. In this case, of an SIR above a given threshold and relatively few pilot symbols, the non-coherent SIR estimator 420 is enabled, that being proved to be the most accurate for a given number of data symbols. As discussed above, the choice of using the non-coherent estimator 420 or the coherent estimator 410 can be based on the prior estimated SIR. In like manner, if the format includes a significant number of known pilot symbols, the controller 550 is configured to enable only the coherent estimator 410, and the selector 590 selects the output of the estimator 410 as the composite/total SIR estimate.

In a UMTS-configured embodiment of this invention, a table such as illustrated in FIG. 6 can be used by the controller 550 to effect the selection. The UTMS slot-format defines the number of data bits, $N_{data1}$, $N_{data2}$, and the number of pilot bits, $N_{pilot}$ in each transmission slot. The ratio of the number of data bits to the number of pilot bits is shown in the fifth column of the table in FIG. 6. When the ratio of data bits to pilot bits is very high, the coherent estimator 410 of FIG. 5 is not enabled, as illustrated by the "off" entry in the sixth column of the table in FIG. 6. When the ratio is very low, the coherent estimator 410 is enabled, as illustrated by the "on" entry in the sixth column. As illustrated in the seventh column of the table in FIG. 6, the non-coherent estimator 420 is enabled when the coherent estimator 410 is not enabled, and vice versa.

Although the table of FIG. 6 illustrates a choice between the coherent and non-coherent estimator, for ease of understanding, one of ordinary skill in the art will recognize that the choice could be expanded to include the decision-feedback estimator, using the principles discussed above regarding the conditions when the decision-feedback estimator can be expected to be more accurate than the non-coherent estimator.

In like manner, although the table of FIG. 6 illustrates an exclusive choice of the estimator to be used, the table could be expanded to include "uncertain" conditions wherein multiple estimators are enabled. In this case, the MSE estimator 460 of FIG. 5 is also enabled, to improve the selection of the estimator that likely yields the most accurate estimate under the uncertain conditions, or to provide the weighting factors for use in providing a composite estimate based on equations (13), (16a-c), above.

One of ordinary skill in the art will also recognize that the particular enable-entries in the UTMS format table of FIG. 6 are presented for illustrative purposes, and other decision rules could be employed. Additionally, one of ordinary skill in the art will recognize that a similar table can be created for other protocols that define the relative number of known and unknown bits for different formats or transmission modes. In like manner, the selection criteria may be based on parameters other than the relative number of known and unknown bits in a sample; for example, if a correlation is determined between data rate or encoding scheme and the reliability of particular SIR estimates, the current data rate or encoding scheme can be used to select which SIR estimate to use as the composite SIR. For example, if a particular encoding scheme provides for a more reliable decoding of the transmitted data symbol than another, the decision table may include a "decision-feedback" column, or sub-column, that controls the enabling of the decision-feedback estimator 430.

One of ordinary skill in the art will also recognize that the "yes/on" and "no/off" enabling entries in the table of FIG. 6 correspond to a binary setting of the weighting coefficients $\alpha_1$ and $\alpha_2$ or $\alpha_3$ to a "0" or "1" value in equations (13) or (16). In an alternative embodiment, the entries in the seventh and eighth columns of FIG. 6 can be predefined weighting factors that are to be used in equations (13) or (16) for each different format, and each SIR estimator 410, 420, 430 is enabled whenever a non-zero entry is present.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

In interpreting these claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) each of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise; and h) no specific sequence of acts is intended to be required unless specifically indicated.

The invention claimed is:

1. A communications device comprising:
a receiver that is configured to receive an information signal, and
an estimator that is configured to determine a composite SIR measure,
wherein an SIR measure is a measure of signal strength in the information signal relative to noise in the information signal, and
the estimator includes: a coherent estimator that is configured to determine a coherent SIR measure, based on received known pilot signals in the information signal, a non-coherent estimator that is configured to determine a non-coherent SIR measure, based on received unknown data signals in the information signal, a decision-feedback estimator that is configured to determine a decision feedback SIR measure, based on determined data signals in the information signal, and a controller that is configured to determine the composite SIR measure based on at least one of the coherent SIR measure, the non-coherent SIR measure, and the decision-feedback SIR measure, wherein at least one of the coherent estimator, the non-coherent estimator and the decision-feedback estimator is not enabled so that at least one of the coherent SIR measure, the non-coherent SIR measure and the decision feedback SIR measure is not computed to determine the composite SIR measure.

2. The communications device of claim 1, further including a transmitter that is configured to communicate the composite SIR measure to another communications device that provided the information signal.

3. The communications device of claim 1, wherein the controller is configured to determine the composite measure based on a select one or more of the coherent SIR measure, the non-coherent SIR measure, and the decision-feedback SIR measure.

4. The communications device of claim 3, wherein the controller is configured to select the select one or more of the coherent SIR measure, the non-coherent SIR measure, and the decision-feedback SIR measure, based on a prior composite SIR measure.

5. The communications device of claim 4, wherein the controller is further configured to determine the composite measure based on a mean-square-error measure associated with at least one of: the coherent SIR measure, the non-coherent SIR measure, and decision-feedback SIR measures.

6. The communications device of claim 3, wherein the controller is configured to select the select one or more of the coherent SIR measure, the non-coherent SIR measure, and the decision-feedback SIR measure, based on a format of the information signal.

7. The communications device of claim 3, wherein the controller is configured to select the select one or more of the coherent SIR measure, the non-coherent SIR measure, and the decision-feedback SIR measure, based on a ratio of a quantity of the pilot bits to a quantity of the data bits in the information signal.

8. The communications device of claim 7, wherein the controller is further configured to select the select one or more of the coherent SIR measure, the non-coherent SIR measure, and the decision-feedback SIR measure, based on an accuracy measure associated with at least one or more of the coherent SIR measure, the non-coherent SIR measure, and the decision-feedback SIR measure.

9. A method of determining a composite SIR measure, comprising:
selectively enabling a determination of
a coherent SIR measure, based on a reception of known pilot symbols,
a non-coherent SIR measure, based on a reception of unknown data symbols, and
a decision feedback SIR measure, based on a reception of determined data symbols, and
determining the composite SIR measure based on at least one of the coherent SIR measure, the non-coherent SIR measure, and the decision-feedback SIR measure
wherein at least one of the coherent SIR measure, the non-coherent SIR measure and the decision feedback SIR measure is not computed to determine the composite SIR measure.

10. The method of claim 9, wherein the decision feedback SIR measure is not computed when a previous SIR measure is above a threshold level, and wherein the non-coherent SIR measure is not computed when the previous SIR measure is below the threshold level.

11. The communications device of claim 1, wherein the controller is further configured to determine the composite SIR measure as a weighted average of two of the coherent SIR measure, the non-coherent SIR measure and the decision-feedback SIR measure.

12. The communications device of claim 1, wherein only one of the decision-feedback estimator and the non-coherent estimator is enabled.

13. The communications device of claim 1, wherein the decision feedback SIR measure is not computed when a previous SIR measure is above a threshold level, and wherein the non-coherent SIR measure is not computed when the previous SIR measure is below the threshold level.

14. The communications device of claim 12, wherein only one of the decision-feedback estimator and the non-coherent estimator is enabled based on a previous SIR estimate.

15. The communications device of claim 1, wherein only two of the coherent estimator, the non-coherent estimator and the decision-feedback estimator are enabled.

16. The communications device of claim 15, wherein only two of the coherent estimator, the non-coherent estimator and the decision-feedback estimator that are associated with the lowest mean-square-error measures are enabled.

17. The communications device of claim 1, wherein only one of the coherent estimator, the non-coherent estimator and the decision-feedback estimator with the most accurate SIR estimate is enabled.

18. The communications device of claim 1, wherein the coherent estimator is always enabled.

19. The communications device of claim 1, wherein at least one of the coherent estimator, the non-coherent estimator and the decision-feedback estimator is enabled based on a slot format of the information signal.

20. A communications device comprising:
a receiver that is configured to receive an information signal, and
an estimator that is configured to determine a composite SIR measure,
wherein an SIR measure is a measure of signal strength in the information signal relative to noise in the information signal, and
the estimator includes: a coherent estimator that is configured to determine a coherent SIR measure, based on received known pilot signals in the information signal, a non-coherent estimator that is configured to determine a non-coherent SIR measure, based on received unknown data signals in the information signal, a decision-feedback estimator that is configured to determine a decision feedback SIR measure, based on determined data signals in the information signal, and a controller that is configured to determine the composite SIR measure based on at least one of the coherent SIR measure, the non-coherent SIR measure, and the decision-feedback SIR measure,
wherein the composite SIR measure, the coherent SIR measure, the non-coherent SIR measure and the decision-feedback SIR measure satisfy:

$\gamma_{tot} = \alpha_1 \gamma_{coh} + \alpha_2 \gamma_{incoh} + \alpha_3 \gamma_{df}$, where $\gamma_{tot}$ represents the composite SIR measure, $\gamma_{coh}$ represents the coherent SIR measure, $\gamma_{incoh}$ represents the non-coherent SIR measure, $\gamma_{df}$ represents the decision-feedback SIR measure, $\alpha_1$ represents a weighting coefficient for the coherent SIR measure, $\alpha_2$ represents a weighting coefficient for the non-coherent SIR measure, and $\alpha_3$ represents a weighting coefficient for the decision-feedback SIR measure, and
wherein the weighting coefficient for the coherent SIR measure, the weighting coefficient for the non-coherent SIR measure, and the weighting coefficient for the decision-feedback SIR measure satisfy:

$$a_1 = \frac{MSE_2 MSE_3}{MSE_1 + MSE_2 + MSE_3},$$

$$a_2 = \frac{MSE_1 MSE_3}{MSE_1 + MSE_2 + MSE_3},$$

$$a_3 = \frac{MSE_1 MSE_2}{MSE_1 + MSE_2 + MSE_3},$$

where $MSE_1$ represents a mean-square-error measure associated with the coherent SIR measure, $MSE_2$ represents a mean-square-error measure associated with the non-coherent SIR measure, and $MSE_3$ represents a mean-square-error measure associated with the decision-feedback SIR measure.

* * * * *